United States Patent
Zimmel et al.

(10) Patent No.: US 7,035,510 B2
(45) Date of Patent: Apr. 25, 2006

(54) FIBEROPTIC FURCATION DEVICE WITH CRIMP

(75) Inventors: Steven C. Zimmel, Minneapolis, MN (US); Michael J. Shorter, Lonsdale, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 219 days.

(21) Appl. No.: 10/613,757

(22) Filed: Jul. 2, 2003

(65) Prior Publication Data

US 2005/0002621 A1 Jan. 6, 2005

(51) Int. Cl.
*G02B 6/44* (2006.01)

(52) U.S. Cl. .................. 385/100; 385/101; 385/106; 385/137

(58) Field of Classification Search ......... 385/100–101, 385/106, 103, 109–110, 112–113, 134–137, 385/139, 86
See application file for complete search history.

(56) References Cited

U.S. PATENT DOCUMENTS

| 4,626,067 | A | 12/1986 | Watson ................. 350/96.2 |
| 5,231,688 | A | 7/1993 | Zimmer ................. 385/139 |
| 5,838,861 | A | 11/1998 | Bunde ................. 385/100 |
| 5,970,195 | A | 10/1999 | Brown ................. 385/100 |
| 6,278,831 | B1 | 8/2001 | Henderson et al. ........ 385/139 |
| 6,389,214 | B1 | 5/2002 | Smith et al. ............ 385/136 |
| 6,438,299 | B1 | 8/2002 | Brown et al. ........... 385/100 |

FOREIGN PATENT DOCUMENTS

| EP | 0 520 946 A1 | 12/1992 |
| EP | 0 544 004 A1 | 6/1993 |
| EP | 0 862 072 A2 | 9/1998 |
| WO | WO 00/08498 | 2/2000 |

OTHER PUBLICATIONS

Exhibit A, Photographs of a coaxial cable splitter device admitted as prior art as of Jul. 2, 2003 (6 pages).

*Primary Examiner*—Javaid H. Nasri
(74) *Attorney, Agent, or Firm*—Merchant & Gould PC (57) ABSTRACT

A cable breakout assembly comprising: a cable furcation device joining a cable including an outer jacket and an inner optical fiber, to an upjacket. The upjacket includes an inner tube for receiving the optical fiber, a stranded strength member outside the inner tube, and an outer tube outside of the strength member. The cable furcation device includes a first end disposed around the end of the outer jacket of the cable. The second end has a projecting tube for receiving the outer tube of the upjacket, the first tube having an inner diameter receiving the inner tube and the optical fiber. The device has an outer crimp surface, and a crimp ring crimps the strength member to the crimp surface. A heat shrunk tube is positioned around a portion of the upjacket, the cable furcation device, and a portion of the cable.

7 Claims, 13 Drawing Sheets

FIG. 16 Prior Art ively, with the second inner bore diameter being
FIBEROPTIC FURCATION DEVICE WITH CRIMP

FIELD OF THE INVENTION

The present invention relates to devices and methods for breaking out, or furcating, optical fibers from within a fiberoptic cable into a larger cable, such as a protective upjacket.

BACKGROUND OF THE INVENTION

Fiberoptic cables often contain one or more individual optical fibers within a jacket. It is desirable to remove the jacket to expose the individual optical fibers, such as for connectorization in order to connect each fiber to telecommunications equipment. Breaking out or furcating of bare optical fibers from within one fiberoptic cable into a larger cable, the upjacket, is known. Typically, the bare optical fibers are inserted into the upjacket before connectorization to provide protection of the optical fiber, including during connectorization. Typically, the upjacket includes an aramid yarn strength member, or other strength member to transfer any loads to the optical connector terminated onto the upjacket, or to the jacket of the fiberoptic cable containing the optical fibers, instead of to the optical fiber.

There is a need for improved devices and methods for breaking out or furcating optical fibers.

SUMMARY OF THE INVENTION

A cable furcation device and method are provided for upjacketing of optical fibers extending from a fiberoptic cable. The cable furcation device includes a housing for receiving the fiberoptic cable on one end. An opposite end receives each upjacket. A crimp is provided for crimping the strength members of the upjackets to the furcation housing. Preferably, the housing includes a projecting tube for receiving inside the tube each individual optical fiber, and a protective buffer tubing of the upjacket. The projecting tube also receives the outer tube of the upjacket.

A cable furcation device comprises a body having a front end and an opposite rear end, the body defining a longitudinal axis therebetween. The front end includes a first tube having a first outer diameter, and a first inner diameter. The front end includes a crimp surface having a second outer diameter larger than the first outer diameter, with the crimp surface located between the first tube and the rear end. The rear end has a third outer diameter larger than the second outer diameter and an inner bore has first and second inner bore portions with first and second bore diameters respectsmaller than the first inner bore diameter, the second inner bore portion located between the first bore portion and the front end. The inner bore extends from the rear end and terminates at an end wall. The body defines a first passage from the first tube to the inner bore. The first inner diameter of the first tube and the first and second inner bore diameters are sized for receiving an optical fiber. The first inner bore diameter is further sized for receiving a jacket of a cable surrounding the optical fiber. The crimp surface is sized for receiving a crimp ring to crimp a strength member of an upjacket. The first outer diameter of the first tube is sized to be received inside a tubular member of the upjacket. The first inner diameter of the first tube and the first and second inner bore diameters are sized for receiving an inner tubular member of the upjacket around optical fiber.

Preferably, the cable furcation device includes a second tube, having the same first outer and inner diameters as the first tube, with the first and second tubes extending parallel to one another.

A cable breakout assembly is provided comprising a cable furcation device which joins a cable to an upjacket. A strength member is crimped to the device. The device is joined to the cable and the upjacket through a heat shrunk tubing.

A method of breaking out optical fibers comprising the steps of: positioning a furcation device over the optical fibers extending from within a jacket of a cable; positioning each optical fiber in a protective inner tube of an individual upjacket; passing the protective inner tube of each of the upjackets into an interior of the furcation device; inserting an end of an outer protective tube of each of the upjackets over a tube of the furcation device; crimping a strength member of each of the upjackets to the furcation device; inserting an end of the jacket of the cable into the furcation device; and heat shrinking a tubing around the furcation device, an exposed portion of the jacket of the cable adjacent to the furcation device, and an exposed portion of the upjacket adjacent to the furcation device.

DETAILED DESCRIPTION OF THE PREFERRED EMBODIMENT

Referring now to FIGS. 1–7, a cable furcation device or connector 10 is provided for breaking out or furcating individual optical fibers 12, 14 from a first cable 16. Cable 16 may also be known as a drop cable. Cable 16 may include an outerjacket 18, and an innerjacket 20. A strength member, such as a wire (not shown) may also be provided with cable 16.

Figure 1:
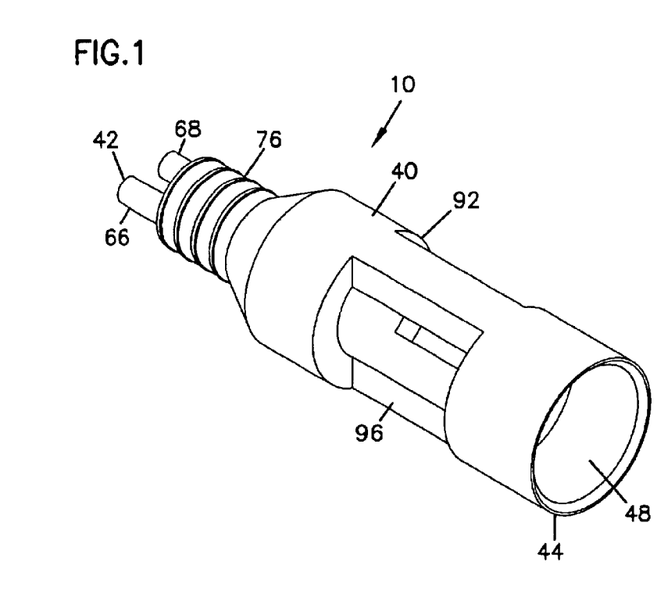
FIG. 1 is a perspective view of a cable furcation device in accordance with one embodiment of the present invention.
Figure 2:
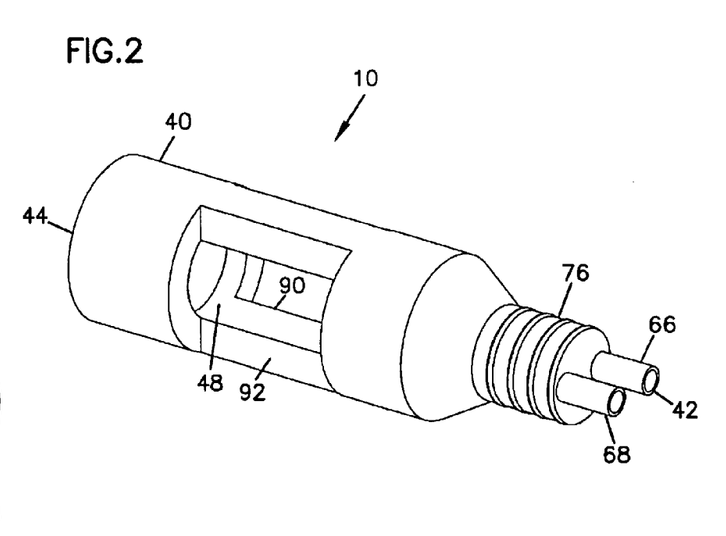
FIG. 2 is a further perspective view of the cable furcation device of FIG. 1.
Figure 3:
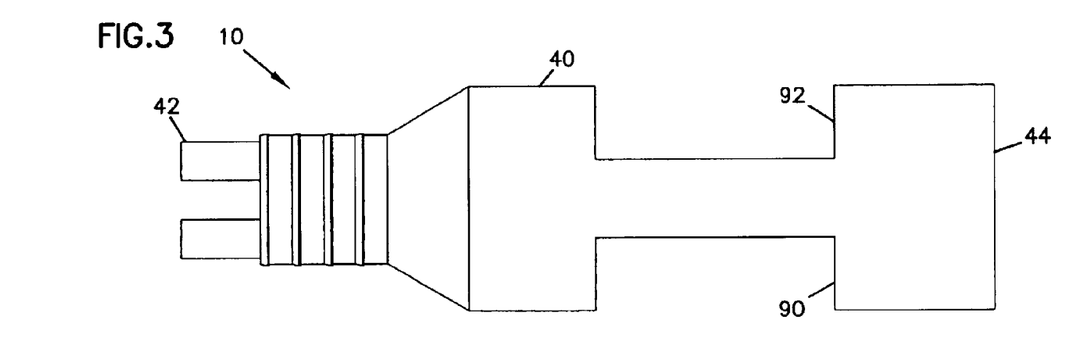
FIG. 3 is a first side view of the cable furcation device of FIG. 1.
Figure 4:
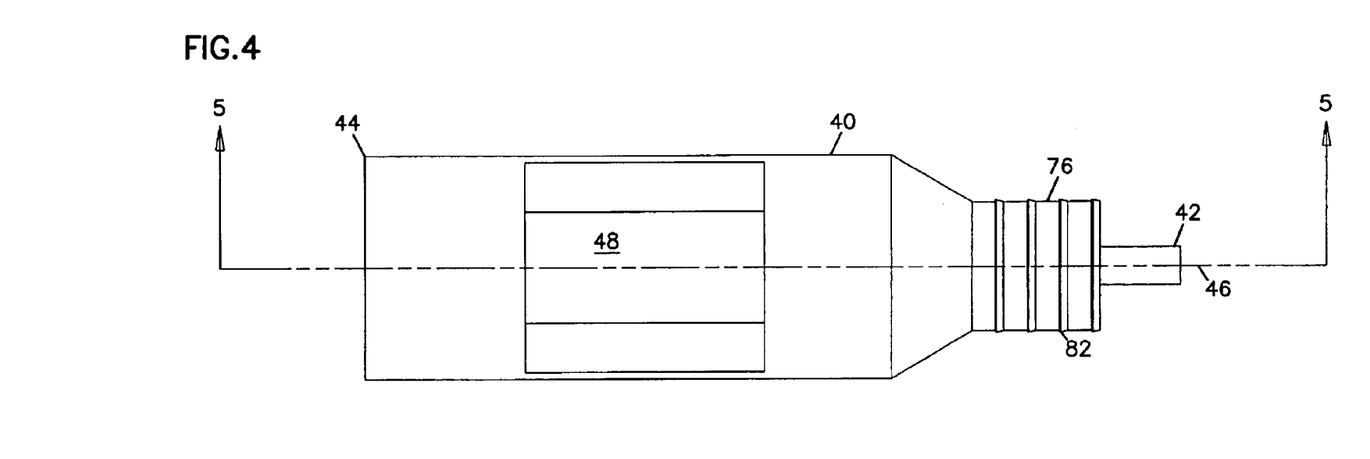
FIG. 4 is a further side view of the cable furcation device of FIG. 1.
Figure 5:
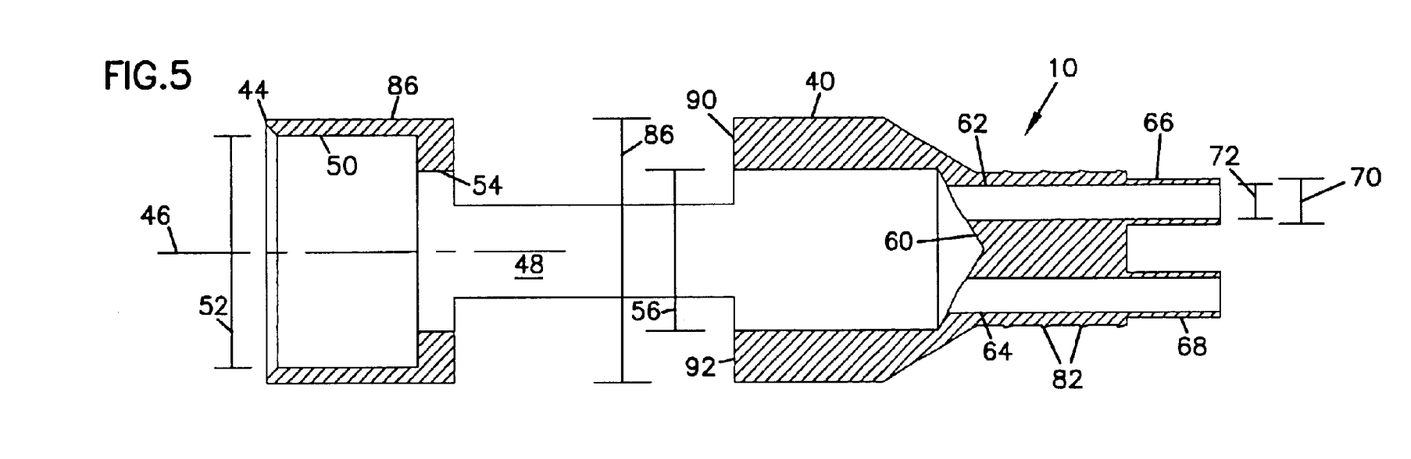
FIG. 5 is a cross-sectional side view of the cable furcation device taken along lines 5—5 of FIG. 4.
Figure 6:
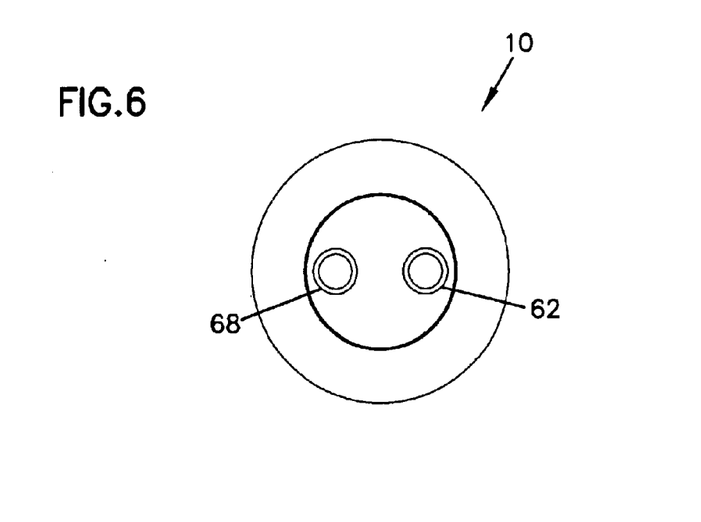
FIG. 6 is an end view of the cable furcation device of FIG. 1.
Figure 7:
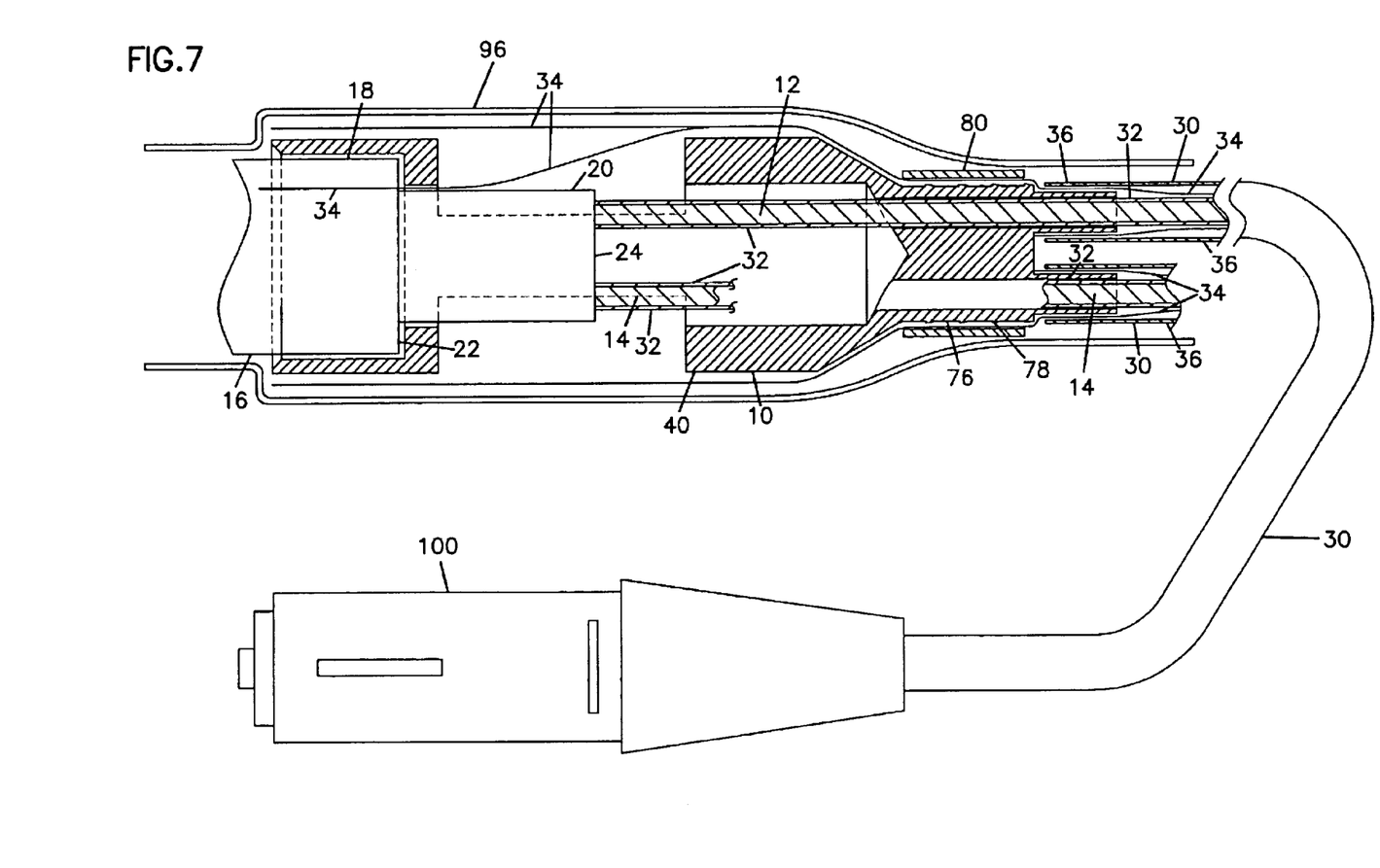
FIG. 7 is a cross-sectional side view of the cable furcation device as in FIG. 5, and showing a cable including two optical fibers, and two upjackets connected to the device, wherein portions of the cable, the upjackets and a heat shrunk tube are shown schematically or have been removed for clarity.

When breaking out the individual optical fibers 12, 14, ends of outer jacket 18 and innerjacket 20 are removed exposing a length of optical fibers 12, 14. Outer jacket 18 is terminated at terminal end 22 and inner jacket 20 is terminated at terminal end 24. Typically, optical fibers 12, 14 are connectorized at an opposite end, such as with any of well known connectors, such as SC, FC, ST, or other connectors as desired. An SC connector 100 is shown in FIG. 7. Connector 100 mates with an appropriate adapter to connect the optical fiber 12, 14 to a further cable or to equipment.

Typically, optical fibers 12, 14 are quite fragile, and susceptible to damage unless otherwise protected in the regions outside of outer and innerjackets 18, 20. An upjacket 30 is provided to protect the individual fibers 12, 14 extending past terminal ends 22, 24. Typically, one upjacket 30 is provided for each optical fiber 12, 14. In the illustrated embodiment of device 10, two optical fibers 12, 14 are shown. Other embodiments include a single optical fiber, or more than two optical fibers such as 4, 6, 8, 12 or any other number of fibers as desired.

Upjacket 30 includes an inner tube, or buffer tube, 32 for receiving one of the optical fibers 12, 14. Positioned around inner tube 32 is a strength member 34, such as strands of aramid fiber. Such strength member 34 protects the optical fibers 12, 14 from damage, such as during tensile loading. Positioned around inner tube 32 and strength member 34 is an outer tube 36. Device 10 is used to allow breaking out of optical fibers 12, 14 from cable 16 into the individual upjackets 30. During use, the strength member 34 is crimped or otherwise mechanically joined to device 10, and an outer heat shrunk tubing or other mechanical attachment surrounds device 10, and the exposed ends of upjackets 30, and cable 16 to join the elements together. Loads are transferred between connector 100 and cable 16, though strength members 34 and device 10, instead of through the optical fibers 12, 14.

Device 10 includes a housing or body 40 having a front end 42 and an opposite rear end 44. Body 40 defines a longitudinal axis 46 extending between front and rear ends 42, 44. In one preferred embodiment, body 40 is made from metal.

Rear end 44 defines an inner bore 48 for receiving cable 16. Inner bore 48 includes a first inner bore portion or passage 50 having a first inner bore diameter 52 and a second inner bore portion or passage 54 having a second inner bore diameter 56 smaller than first inner bore diameter 52. Inner bore 48 terminates at end wall 60. Inner bore 48 further communicates with first passage 62 and second passage 64. First and second passages 62, 64 communicate with first and second tubes 66, 68.

Front end 42 connects to the upjackets 30. In particular, each of first and second tubes 66, 68 includes a first tube outer diameter 70 and a first tube inner diameter 72. First tube inner diameter 72 is sized to receive inner tube 32 of upjacket 30. Inner tube 32 further receives one of optical fibers 12, 14 within inner tube 32. Tubes 66, 68 are offset from axis 46. Other spacings are possible, but a symmetrical spacing is preferred. As different numbers of tubes are provided, the spacings will vary in order to accommodate different numbers of optical fibers used with device 10.

Strength member 34 of upjacket 30 is positioned adjacent to a crimp surface 76 of body 40 positioned between first and second tubes 66, 68 and rear end 44. Crimp surface 76 defines a second outer diameter 78. A crimp ring 80 cooperates with crimp surface 76 to crimp to strength member 34. A plurality of barbs 82 on crimp surface 76 further enhance the crimping of strength member 34 to crimp surface 76.

Outer tube 36 of upjacket 30 is positioned around first tube outer diameter 70 of the respective first and second tubes 66, 68. If desired, a further crimp can be included to crimp outer tube 36 to the respective first and second tubes 66, 68.

Body 40 further includes a third outer diameter 86 which is larger than second outer diameter 78. In the preferred embodiment, second outer diameter 78 is larger than first tube outer diameter 70.

In the preferred embodiment, body 40 includes cut outs 90, 92. Cut outs 90, 92 allow access for a user of device 10 to inner bore 48. Also, cut outs 90, 92 can be used to reach in with a tool (tweezers) to pull inner tubes 32 toward inner jacket 20. In some instances, it may be desirable to insert inner tubes 32 into inner jacket 20.

Figure 8:
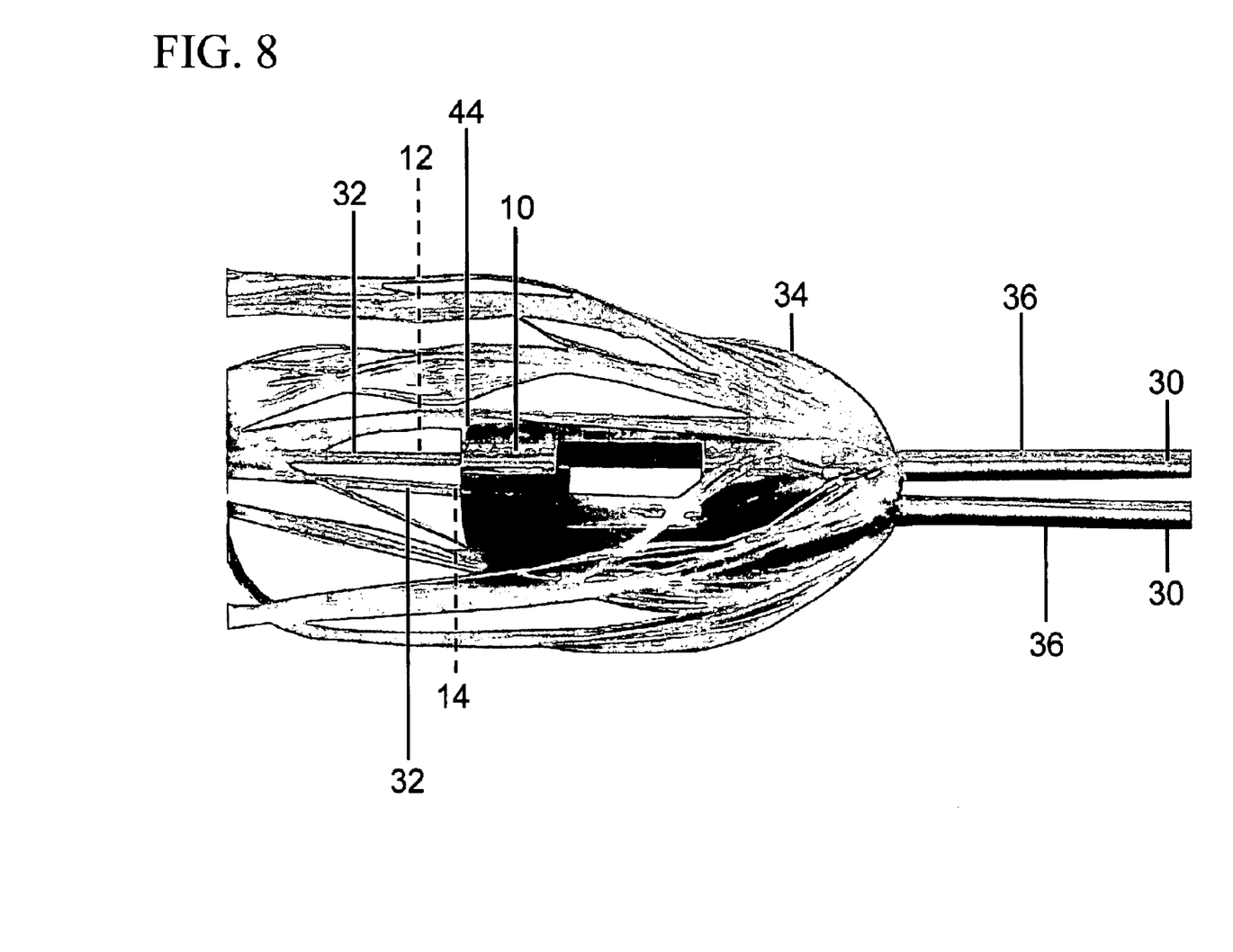
FIG. 8 shows the cable furcation device of FIG. 1 during an initial stage of assembly for the cable break out, showing the upjackets connected to the device, prior to crimping of the strength members.

Referring now to FIGS. 8 through 14 in addition to FIGS. 1 through 7, a preferred method of assembly is shown. In FIG. 8, upjackets 30 are shown where two outer tubes 36 are positioned over first and second tubes 66, 68. Strength member 34, comprised of a plurality of fibers or strands, of each jacket 30 is shown extending from outer tubes 36, prior to crimping. Inner tubes 32 are shown extending through inner bore 48 and exiting device 10 at rear end 44.

Figure 9:
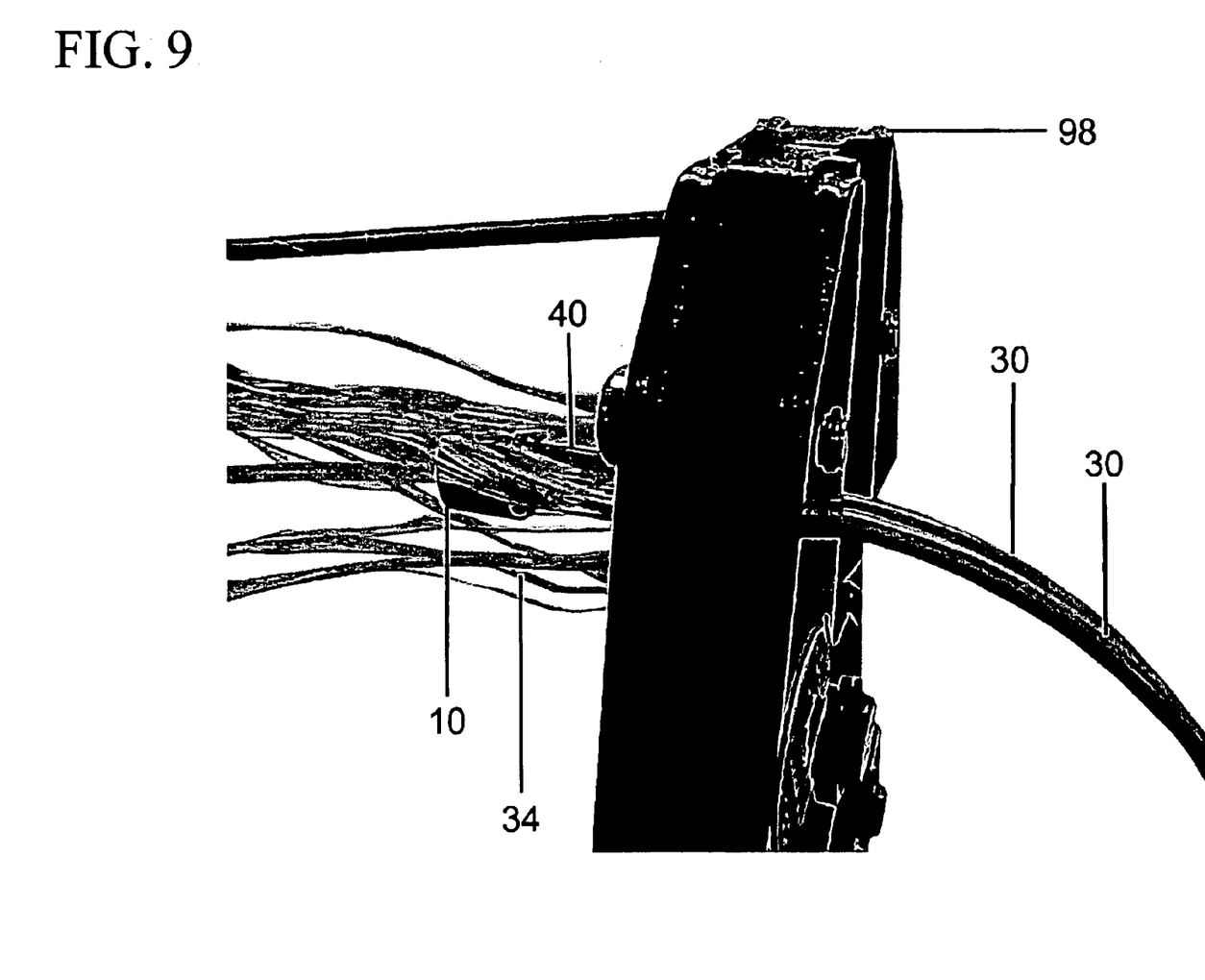
FIG. 9 shows a further step in the assembly, showing crimping of the strength members.
Figure 10:
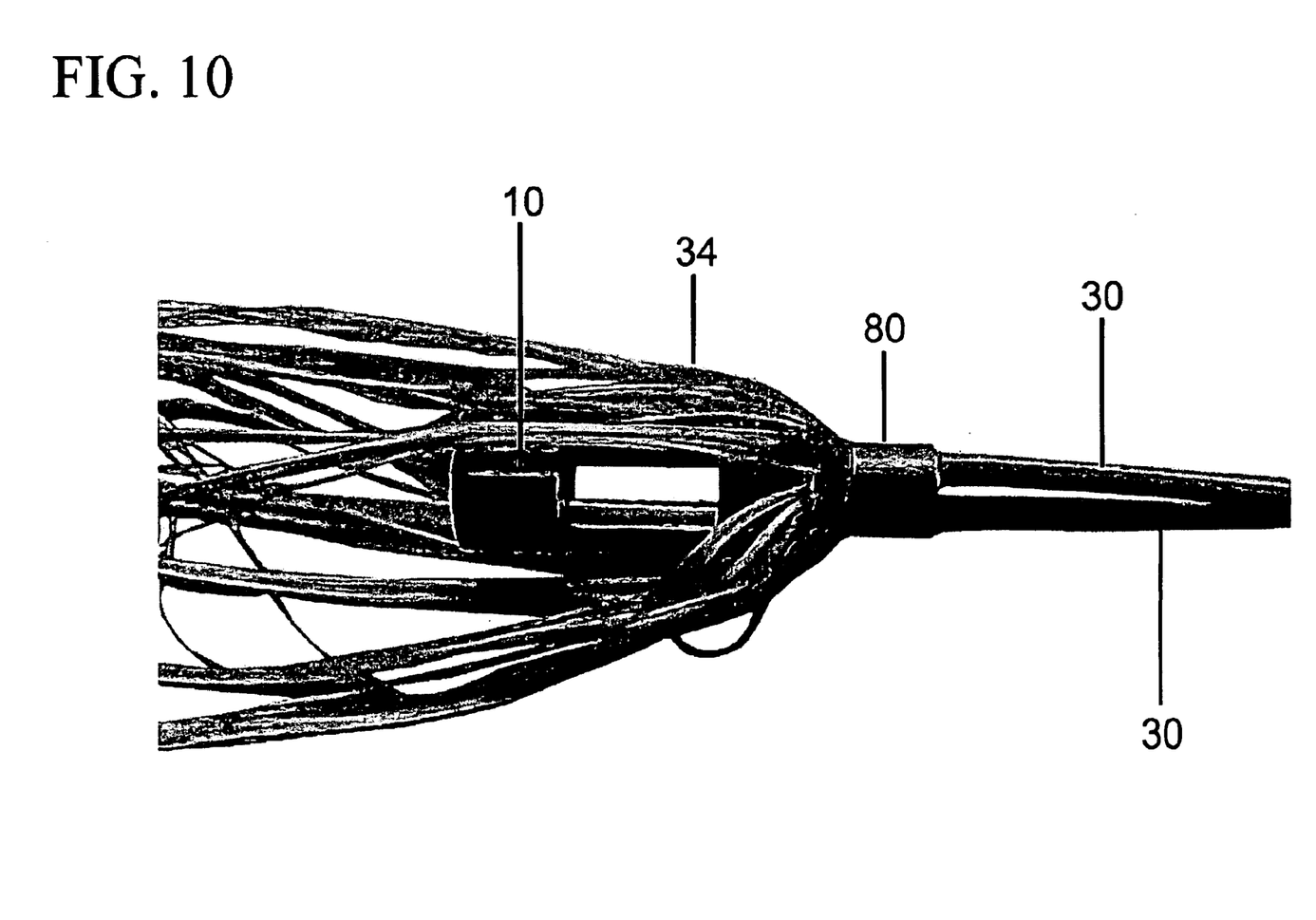
FIG. 10 shows a further step in the assembly, showing the strength members crimped to the device.

FIG. 9 shows strength members 34 being crimped with a crimp tool 98 to body 40. FIG. 10 shows the resulting crimp ring 80 crimped into position.

Figure 11:
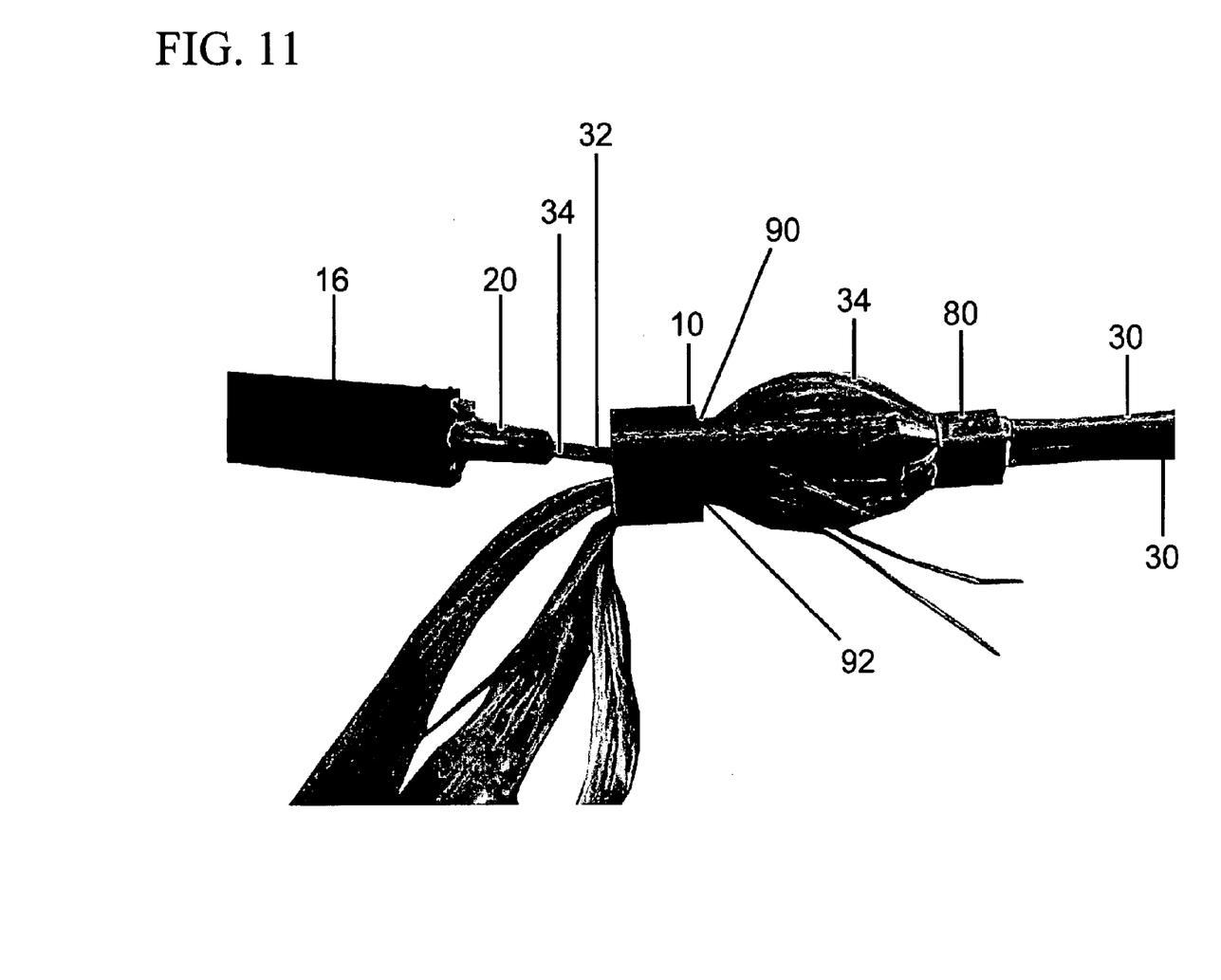
FIG. 11 shows a further step in the assembly, showing the cable prior to insertion of the jacket into the device.

FIG. 11 shows strength members 34 passing into cut outs 90, 92 into inner bore 48.

Figure 12:
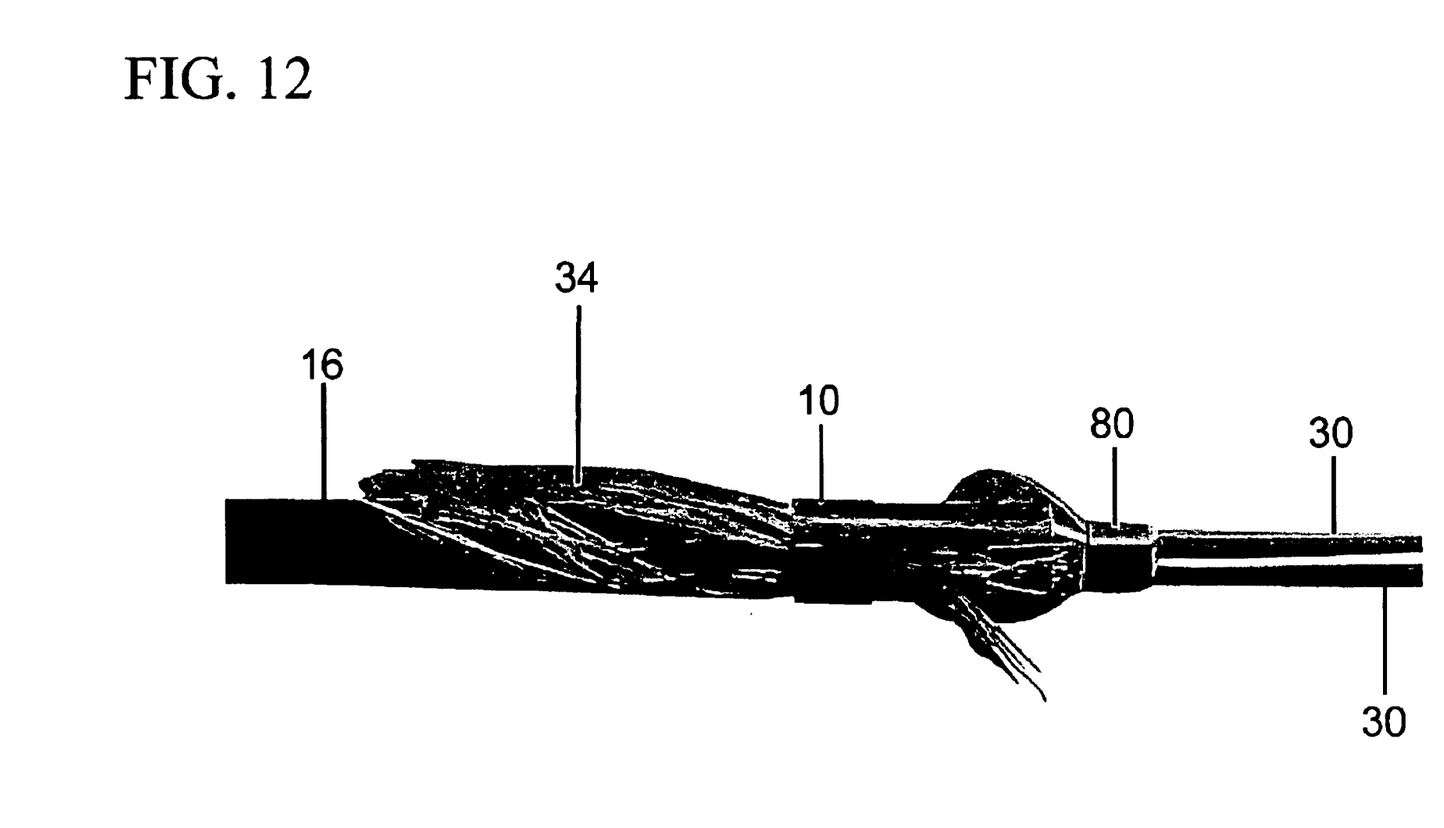
FIG. 12 shows a further step in the assembly, showing the jacket of the cable inserted into the device.

FIG. 12 shows cable 16 with terminal ends 22, 24 of outer and inner jackets 18, 20 inserted into inner bore 48.

Figure 13:
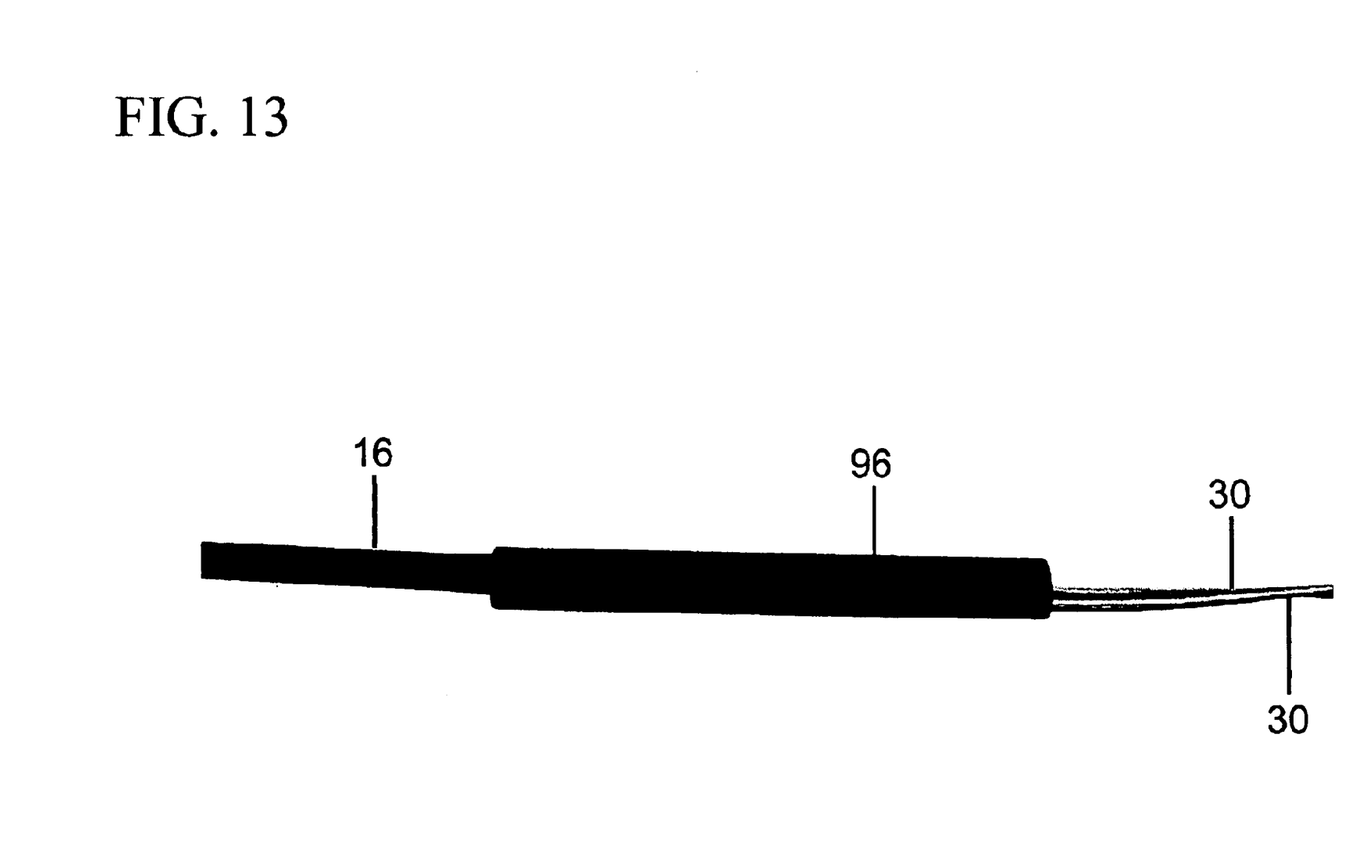
FIG. 13 shows a further step in the assembly, showing the heat shrinkable tube positioned over the device and the exposed ends of the cable and the upjackets.

FIG. 13 shows a heat shrinkable tube 96 prior to heat shrinking around device 10, cable 16, and upjackets 30. Tube 96 is any of a known heat shrink device, such as a polyolefin tube with heat activated adhesive inside.

Figure 14:
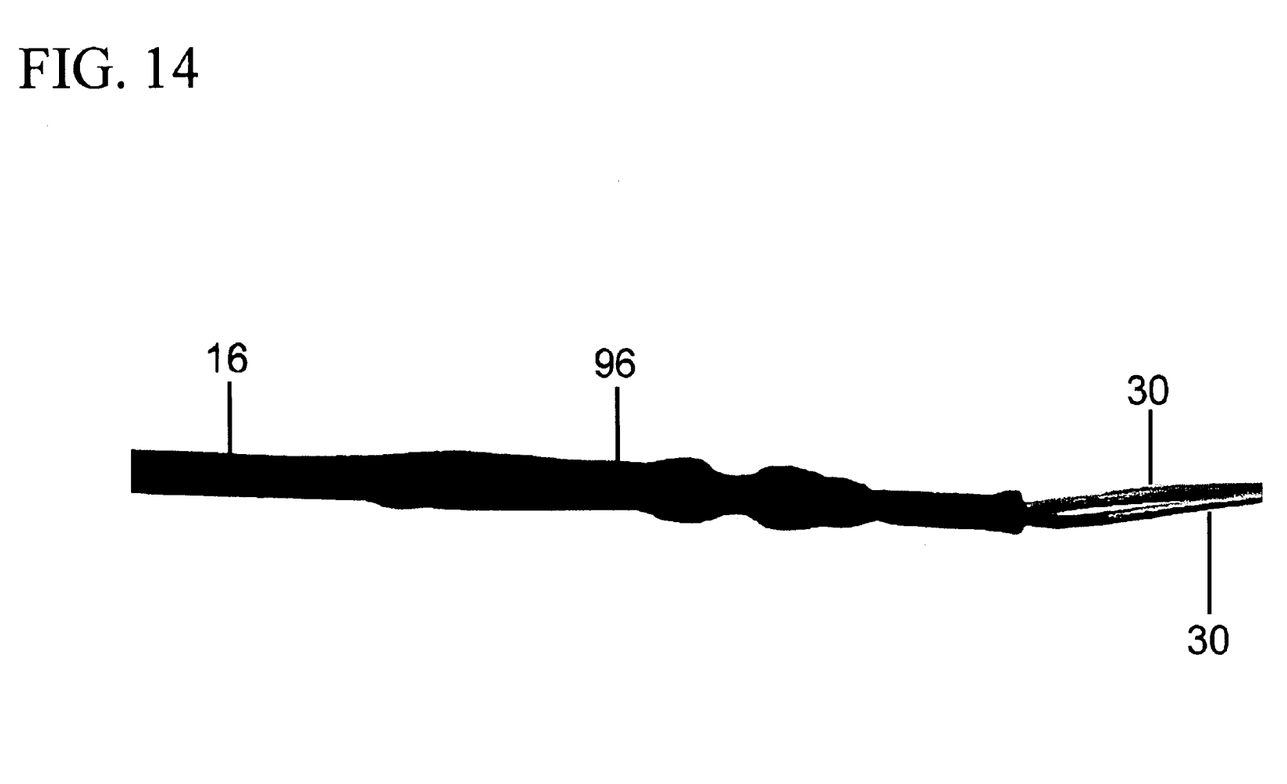
FIG. 14 shows a further step in the assembly, showing the heat shrunk tube over the cable furcation device and the cable and the upjackets.

FIG. 14 shows tube 96 after the heat shrinking process is completed.

Figure 15:
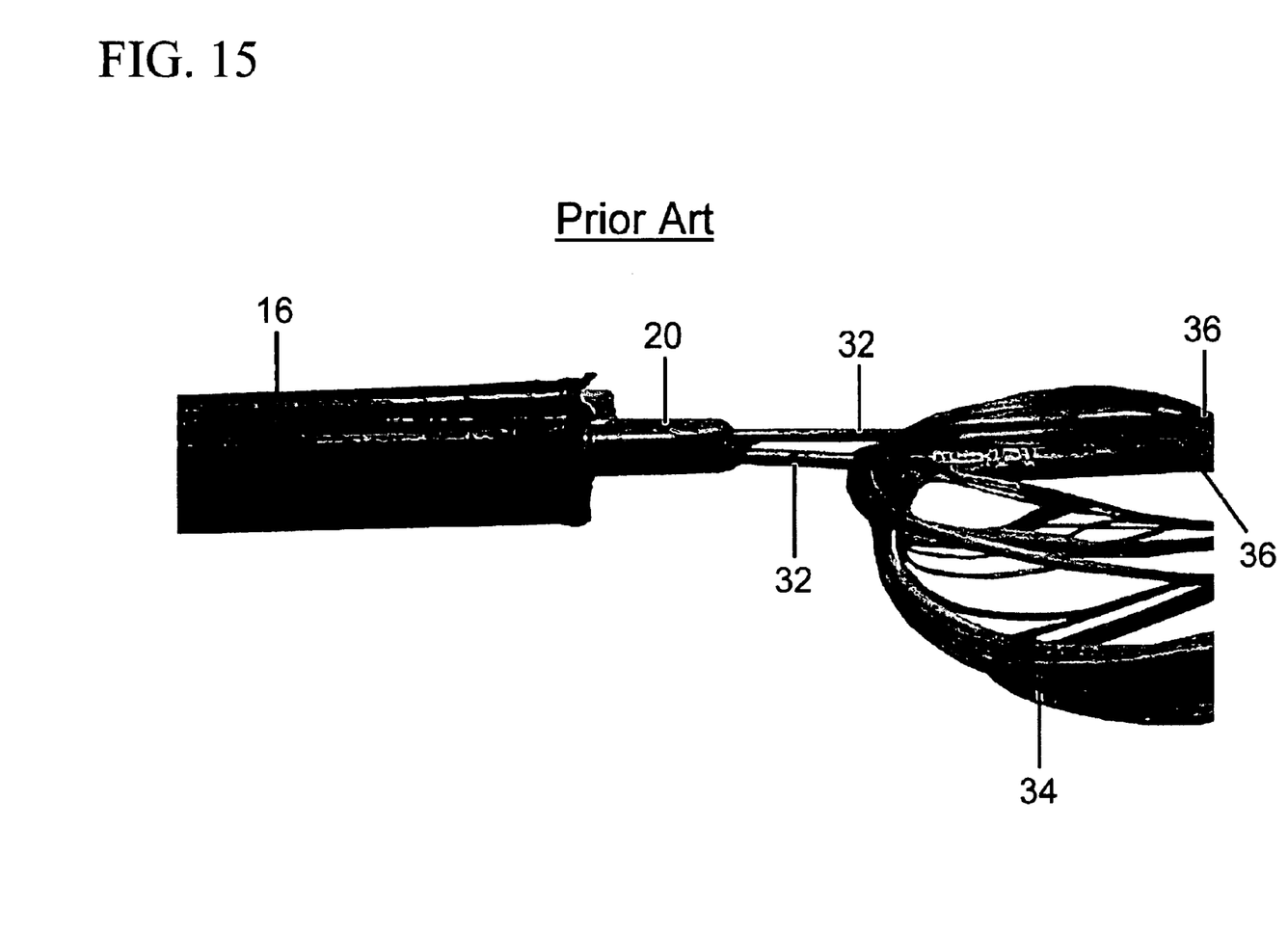
FIG. 15 shows a prior art break out during assembly including two upjackets positioned relative to two optical fibers of a cable.
Figure 16:
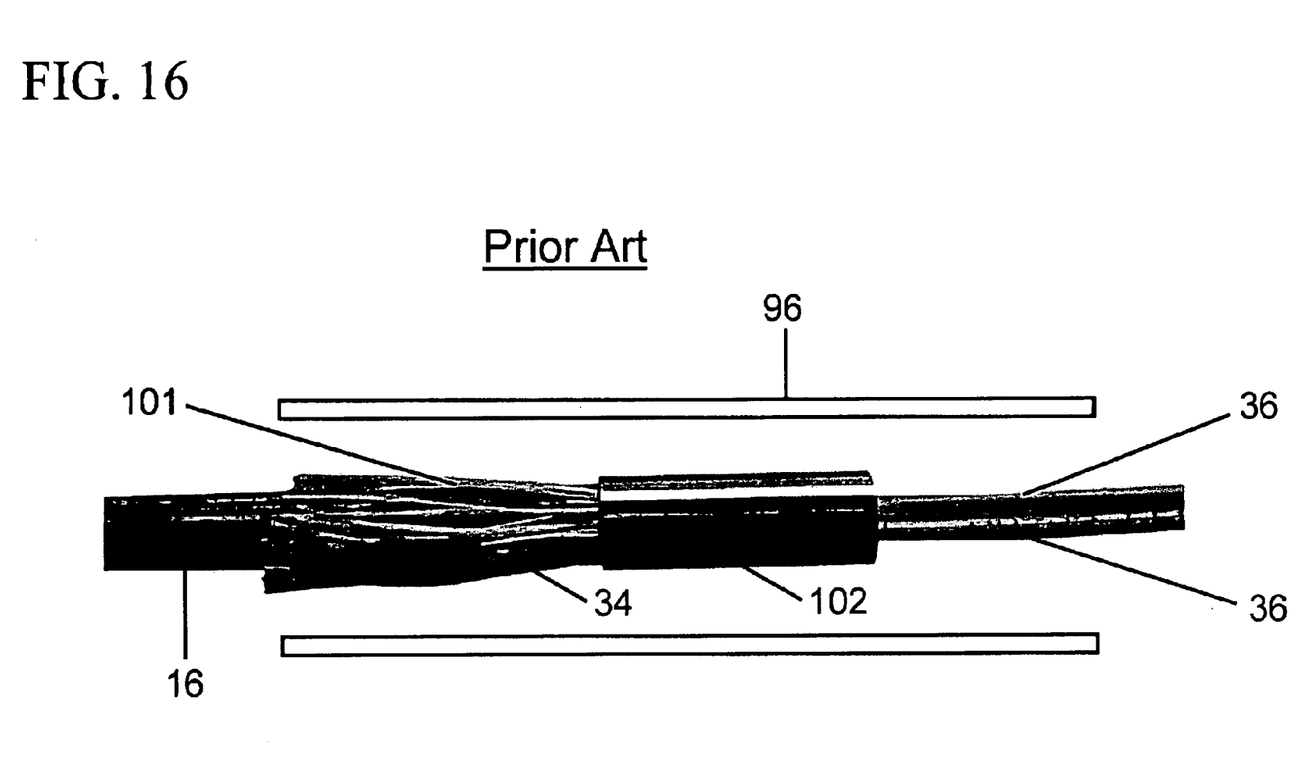
FIG. 16 shows the assembly of FIG. 15 with a protective metallic sleeve over the ends of the cable and the upjackets, and showing the strength member exposed prior to the heat shrinkable tube being placed over the protective metal tube and the ends of the cable and upjackets, and the strength member.

Device 10 of the present invention reduces the risk of a fiber breaking within the connector of an upjacket when a tensile load is applied. By crimping strength member 34 to body 40, slack in strength member 34 is avoided. With prior art techniques, any slack in strength member 34 which was not accounting for, could lead to fiber breakage since any tensile loading would be applied to the fiber, until any slack in strength member 34 was taken up. In the present invention, the strength member 34 is crimped adjacent to the location it exits outer tube 36 of upjacket 30. Device 10 is then mechanically attached to cable 16, and to outer tubes 36, such as with a heat shrunk tubing. IN FIGS. 15 and 16 strength members 34 of the prior art were attached only at the exposed ends 101 which extended past sleeve 102.

Strength members 34 which extend past crimp ring 80 in the present invention are believed to further assist with attachment of upjacket 30 and device 10 to cable 16. It is to be appreciated that the extending strength members 34 past crimp ring 80 is optional.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A cable furcation device comprising:

a body having a front end and an opposite rear end, the body defining a longitudinal axis therebetween;

the front end including a first tube having a first outer diameter, and a first inner diameter;

the front end including a crimp surface having a second outer diameter larger than the first outer diameter, the crimp surface located between the first tube and the rear end;

the rear end having a third outer diameter larger than the second outer diameter and an inner bore having first and second inner bore portions with first and second bore diameters respectively, the second inner bore diameter smaller than the first inner bore diameter, the second inner bore portion located between the first bore portion and the front end, the inner bore extending from the rear end and terminating at an end wall;

the body defining a first passage from the first tube to the inner bore;

wherein the first inner diameter of the first tube and the first and second inner bore diameters are sized for receiving an optical fiber;

wherein the first inner bore diameter is further sized for receiving a jacket of a cable surrounding the optical fiber;

wherein the crimp surface is sized for receiving a crimp ring to crimp a strength member of an upjacket;

wherein the first outer diameter of the first tube is sized to be received inside an outer tubular member of the upjacket;

wherein the first inner diameter of the first tube and the first and second inner bore diameters are sized for receiving an inner tubular member of the upjacket around optical fiber.

2. The cable furcation device of claim 1, further comprising a second tube, having the same first outer and inner diameters as the first tube, the first and second tubes extending parallel to one another.

3. A cable breakout assembly comprising:

a. a drop cable including an outer jacket defining an outer diameter, and a first inner optical fiber, having a first portion surrounded by the outer jacket, and a second portion extending beyond the outer jacket at a terminal end of the outer jacket;

b. a first upjacket including:
       1. a first inner tube defining an inner diameter, the inner tube receiving the second portion of the first optical fiber in the inner diameter, the inner tube defining an outer diameter;
       2. a stranded strength member outside the first inner tube;
       3. a first outer tube outside of the strength member, the first outer tube having an inner diameter;

c. a cable furcation device including:
       1. a body having a first end disposed around the outer diameter of the outer jacket of the drop cable;
       2. the body having an inner passage for receiving the second portion of the first optical fiber;
       3. the body having a projecting first tube in communication with the inner passage and received inside the inner diameter of the first outer tube of the first upjacket, the first tube having an inner diameter receiving the first inner tube and the second portion of the first optical fiber;
       4. the body having an outer crimp surface;
       5. a crimp ring crimping the strength member to the crimp surface;
       6. a heat shrunk tube around a portion of the first upjacket, the cable furcation device, and a portion of the drop cable.

4. The cable breakout assembly of claim 3, wherein the drop cable includes a plurality of first optical fibers, and the body includes a plurality of inner passages and projecting first tubes, and further comprising a plurality of first upjackets, wherein each first optical fiber is positioned in one of the inner passages and in one of the projecting first tubes, wherein each of the first inner tubes are received in one of the first tubes, wherein each of the first outer tubes are received by one of the first tubes, wherein each of the strength members are crimped by the same crimp ring, and the heat shrunk tube is around all of the first upjackets.

5. The cable breakout assembly of claim 4, wherein the drop cable includes an inner jacket which terminates within the body of the cable furcation device.

6. The cable breakout assembly of claim 3, wherein the drop cable includes an inner jacket which terminates within the body of the cable furcation device.

7. A method of breaking out optical fibers comprising the steps of:

positioning a furcation device over the optical fibers extending from within a jacket of a cable;

positioning each optical fiber in a protective inner tube of an individual upjacket;

passing the protective inner tube of each of the upjackets into an interior of the furcation device;

inserting an end of an outer protective tube of each of the upjackets over a projecting tube of the furcation device;

crimping a strength member of each of the upjackets to the furcation device;

inserting an end of the jacket of the cable into the furcation device;

heat shrinking a tubing around the furcation device, an exposed portion of the jacket of the cable adjacent to the furcation device, and an exposed portion of the upjacket adjacent to the furcation device.

* * * * *